United States Patent
Li et al.

(10) Patent No.: US 8,158,545 B2
(45) Date of Patent: Apr. 17, 2012

(54) METHODS, SYSTEMS, AND DEVICES FOR DEEP DESULFURIZATION OF FUEL GASES

(75) Inventors: Liyu Li, Richland, WA (US); David L. King, Richland, WA (US); Jun Liu, Richland, WA (US); Qisheng Huo, Richland, WA (US)

(73) Assignee: Battelle Memorial Institute, Richland, WA (US)

( * ) Notice: Subject to any disclaimer, the term of this patent is extended or adjusted under 35 U.S.C. 154(b) by 331 days.

(21) Appl. No.: 12/140,798

(22) Filed: Jun. 17, 2008

(65) Prior Publication Data

US 2009/0114093 A1     May 7, 2009

Related U.S. Application Data

(60) Provisional application No. 60/944,621, filed on Jun. 18, 2007.

(51) Int. Cl.
    *B01J 20/34*               (2006.01)
(52) U.S. Cl. .............. 502/20; 95/135; 95/148; 502/240; 502/258; 502/400; 502/406; 502/407; 502/415
(58) Field of Classification Search .................... 95/135; 502/20, 240, 258, 400, 406, 407, 415
See application file for complete search history.

(56) References Cited

U.S. PATENT DOCUMENTS

| | | | |
|---|---|---|---|
| 4,478,800 | A | 10/1984 | van der Wal et al. |
| 2004/0202597 | A1 | 10/2004 | Hesboll et al. |
| 2005/0201920 | A1 | 9/2005 | Shan et al. |
| 2005/0258077 | A1 | 11/2005 | Landau et al. |
| 2006/0166809 | A1 | 7/2006 | Malek et al. |

FOREIGN PATENT DOCUMENTS

| | | |
|---|---|---|
| EP | 1447124 A1 | 8/2004 |
| GB | 1351786 A | 5/1974 |
| WO | WO 2004045767 A2 * | 6/2004 |

OTHER PUBLICATIONS

PCT Written Opinion/Search Report, 2008.

* cited by examiner

*Primary Examiner* — Robert J Hill, Jr.
*Assistant Examiner* — Christopher P Jones
(74) *Attorney, Agent, or Firm* — D. H. Maughan; A. J. Gokcek

(57) ABSTRACT

A highly effective and regenerable method, system and device that enables the desulfurization of warm fuel gases by passing these warm gasses over metal-based sorbents arranged in a mesoporous substrate. This technology will protect Fischer-Tropsch synthesis catalysts and other sulfur sensitive catalysts, without drastic cooling of the fuel gases. This invention can be utilized in a process either alone or alongside other separation processes, and allows the total sulfur in such a gas to be reduced to less than 500 ppb and in some instances as low as 50 ppb.

14 Claims, 7 Drawing Sheets

Sulfur removal performance of Ni-based adsorbents

| Adsorbent | Capacity before 100 ppb sulfur breakthrough, g.S/f.adsorbent*100, % | Regenerability |
|---|---|---|
| SBA-16 | <0.01% | N/A |
| 16.6 wt% Ni fumed SiO$_2$ | 0.45% for 1$^{st}$ cycle. ~0.22% for 2$^{nd}$ to 4$^{th}$ cycle. | Partially Regenerable |
| 16.6 wt% Ni on SBA-15 | ~3% for 1$^{st}$ cycle. ~0% for 2$^{nd}$ cycle. | Not Regenerable |
| 16.6 wt% Ni on $\gamma$-Al$_2$O$_3$ | ~1.5% for 1$^{st}$ cycle. ~0% for 2$^{nd}$ cycle. | Not Regenerable |
| 16.6 wt% Ni on SBA-16 | ~0.7% up to 5 cycles. | Regenerable |

1. All the adsorbents were reduced in flowing H$_2$ at 500°C for 4 hr before sulfur adsorption.
2. Sulfur removal conditions: T=300°C; coal gas composition: 23% H$_2$, 29% CO, 8% CO$_2$, 30% H$_2$O, 10% He, 10 ppm H$_2$S; flow rate: 12,000 hr$^{-1}$ GHSV.
3. Used adsorbents were regenerated using 5-cycle "oxidation-reduction" process. Regeneration condition: T=550°C, reduction gas: 100% H$_2$ at 24,000 hr$^{-1}$ GHSV; oxidation gas: 10% air in Ar at 24,000 hr$^{-1}$ GHSV. Three minutes purge with Ar between oxidation and reduction treatment.

*Fig. 6*

METHODS, SYSTEMS, AND DEVICES FOR DEEP DESULFURIZATION OF FUEL GASES

CROSS REFERENCE TO RELATED APPLICATION

This application claims priority from Provisional application No. 60/944,621 filed 18 Jun. 2007.

FEDERALLY-SPONSORED RESEARCH AND DEVELOPMENT

This invention was made with Government support under Contract DE-AC0576RLO1830 awarded by the U.S. Department of Energy. The Government has certain rights in the invention.

BACKGROUND OF THE INVENTION

Syngas generated by the gasification of coal or biomass has many potential applications, including the production of hydrocarbon transportation fuels, chemicals (including hydrogen), and electric power. Most syngases contain impurities that may make it unsuitable for various end uses. Sulfur-containing molecules, primarily $H_2S$ and COS, are especially troublesome catalyst poisons that must be removed to the parts per billion levels for the production of fuels and chemicals. Although technical approaches exist for removal of these sulfur species, these approaches typically tend to be rather costly, require temperature fluctuations, and in many cases backup sacrificial adsorbents. Since catalytic processes for the production of fuels and chemicals typically operate in the range of 225-300° C., a process that requires the cooling of syngas followed by a re-heating is energy inefficient. A process that is capable of removing sulfur gases to the 50 ppb level at or somewhat above the temperature of the synthesis step is much preferred.

Syngas composition is a function of several parameters, including gasifier type, operating conditions and fuel source. In the case of coal, a combination of zinc oxide with a regenerable downstream polishing bed is a promising approach. For biomass, which typically generates less than 100 ppm of sulfur gases, a stand-alone regenerable sulfur sorbent may provide an attractive approach. In the past, the development of regenerable metal sorbents has typically been stymied by the strong tendency of the metals to sinter or aggregate during the regeneration process. This results in a loss of surface area and therefore sulfur adsorbent capacity. What is needed, therefore, is a method, system and device that allows for deep (ppb) desulfurization of fuel gasses. What is also needed is a regenerable desulfurization system. What is also needed is a desulfurization system that performs effective desulfurization at warm temperatures. The present invention provides a solution to these needs.

Additional advantages and novel features of the present invention will be set forth as follows and will be readily apparent from the descriptions and demonstrations set forth herein. Accordingly, the following descriptions of the present invention should be seen as illustrative of the invention and not as limiting in any way.

SUMMARY OF THE INVENTION

The present invention is a highly effective and regenerable method, system and device that enables the deep desulfurization of warm fuel gases by passing these warm gasses over metal-based sorbents arranged in a mesoporous substrate. This technology protects Fischer-Tropsch synthesis catalysts and other sulfur sensitive catalysts, without drastic cooling of the fuel gases, and without sintering or agglomeration of the metal sorbents during the regeneration process. This allows for much more energy efficient processes for deep desulfurization to be designed. The system is characterized by active metal-based sorbents such as transient metals like Cr, Fe, Co, Ni, Cu, Ru, Rh, Pd, Ag, Pt, Au and mixtures and alloys thereof that are attached to a porous substrate, particularly a mesoporous silicate such as SBA-16.

These devices enable a process whereby warm fuel gasses such as natural gas, syngas, $H_2$, CO, and hydrocarbon gases, mixtures of hydrocarbon gasses, and mixtures of hydrocarbon gases and inert gases, having a temperature between 20 and 900 degrees C. are passed over these sorbents to effect desulfurization of these gases down to a ppb level. These devices also allow for the regeneration of these materials after use by a cycling "oxidation-reduction" process that utilizes H2, CO, O2, N2, air, inert gases and steam in various combinations, at temperatures between 100° C. and 900° C. These processes can be utilized in a process either alone or alongside other separation processes. For high sulfur coal gas cleanup, the nanostructured metal-based sorbent bed may be attached to a separate process that can remove sulfur to ppm level (such as zinc oxide and related oxide absorbents). The present invention will then polish this gas stream by removing sulfur to ppb level. The present invention allows the total sulfur in such a gas to be reduced to less than 100 ppb and in some instances as low as 10 ppb.

The present invention utilizes stabilized active metal sorbent particles dispersed on a controlled nanoporous substrate that enables for desulfurization of warm fuel gases. In some embodiments of the invention the metal-based sorbents comprise 0.1 to 100 weight percent metals relative to the substrates. Examples of various types of metals that can act as sorbents include: Cr, Mn, Fe, Co, Ni, Cu, Zn, Ru, Rh, Pd, Ag, Pt, Au and their alloys. Of this group particular success has been shown in systems that utilize transient metals selected from the group consisting of Ni, Cu, Fe, Ag, Co and their alloys.

Examples of various types of substrates include silica-based materials (including mesoporous silica in any form, fumed silica in any form, and zeolites in any form). These types of materials may be combined in a variety of forms and may be utilized to treat a variety of gasses including but not limited to natural gas, syngas (including both coal and biomass syngas), $H_2$, CO, and other hydrocarbon gases, their mixtures, and their mixtures with inert gases. Examples of the types of materials that may be captured include but are not limited to $H_2S$, COS, mercaptans, sulfides, disulfides, and thiophenes.

These metal-mesoporous materials may be incorporated into a system wherein warm fuel gases having a temperature in the range between ambient temperature (20° C.) to 900° C. can be effectively treated. In one embodiment of the invention this temperature is preferably between 100° C. to 700° C. and more preferably from 150° C. to 500° C. After these sorbents have been filled in this treatment process, these sorbents can be regenerated through a combination of "oxidation-reduction" treatments, over a series of cycles. Typically, this regeneration step is performed between one and ten cycles and preferably between 2 to 5 cycles. This "oxidation-reduction" regeneration process can be carried out using any gas stream that can oxidize metal sulfides (such as $O_2$ and its mixtures with inert gases and steam) and any gas stream that can reduce metal oxides (such as $H_2$, CO, syngas, and their mixtures with inert gases and steam). Examples of such a configuration include those wherein the oxidative gas is 2% $O_2$ in $N_2$.

The present invention enables deep desulfurization of warm gasses. The mesoporous structures described prevent metal particle agglomeration and pore blocking, and maintaining access to the active metal sites. These nanostructured sorbents can reduce the sulfur concentration from warm fuel gases to well below 50 ppb, and can be repeatedly regenerated using a combined oxidation and reduction process.

The purpose of the foregoing abstract is to enable the United States Patent and Trademark Office and the public generally, especially the scientists, engineers, and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

Various advantages and novel features of the present invention are described herein and will become further readily apparent to those skilled in this art from the following detailed description. In the preceding and following descriptions I have shown and described only the preferred embodiment of the invention, by way of illustration of the best mode contemplated for carrying out the invention. As will be realized, the invention is capable of modification in various respects without departing from the invention. Accordingly, the drawings and description of the preferred embodiment set forth hereafter are to be regarded as illustrative in nature, and not as restrictive.

BRIEF DESCRIPTION OF THE DRAWINGS

FIG. 6 is a table showing the testing results of various embodiments and materials.

DETAILED DESCRIPTION OF THE INVENTION

The following description includes the preferred best mode of one embodiment of the present invention. It will be clear from this description of the invention that the invention is not limited to these illustrated embodiments but that the invention also includes a variety of modifications and embodiments thereto. Therefore the present description should be seen as illustrative and not limiting. While the invention is susceptible of various modifications and alternative constructions, It should be understood, that there is no intention to limit the invention to the specific form disclosed, but, on the contrary, the invention is to cover all modifications, alternative constructions, and equivalents falling within the spirit and scope of the invention as defined in the claims.

FIGS. 1-8 show a variety of embodiments of the present invention. Referring first to FIGS. 1A and 1B, schematic views of one embodiment of the present invention is shown. In the first preferred embodiment a regenerable sulfur gas sorbent that may find general use for cleanup of gasifier-derived syngas for synthesis applications is described. In the preferred embodiments of the invention a metal such as nickel (Ni) or copper (Cu) is utilized within a nanoporous material. This nanoporous material allows for surface chemisorption rather than bulk sulfide formation and enables a 50 ppb maximum residual sulfur level to be achieved. Prior attempts to utilize metal-based sulfur getters have been limited to sacrificial adsorbents principally because of the strong tendency of the metals to sinter or aggregate during the regeneration process. This sintering or agglomeration process results in the loss of surface area and sulfur adsorbent capacity.

This embodiment shows a the structure and application of unique metal-based adsorbents in which small metal particles (comprising Ni—Cu alloys) are contained and stabilized within nano-porous silica structure. The isolation and stabilization of the small metal particles allows regeneration of the fully loaded sorbents through multiple cycles with minimal sintering and loss of capacity. In the embodiment shown in FIG. 1, nickel metal was selected as the active adsorbent material loaded within a three-dimensional cubic pore structure mesoporous silica (SBA-16). In addition to providing a high surface area and excellent chemical inertness, SBA 16 also included a unique three-dimensional interconnected channel structure (~3 nm diameter) with relatively larger pore diameter (5 nm) at the channel intersections. The nickel particles, which fill the channel intersections of SBA-16, are constrained due to the small connecting pore diameter of 3 nm.

Figure 1A:
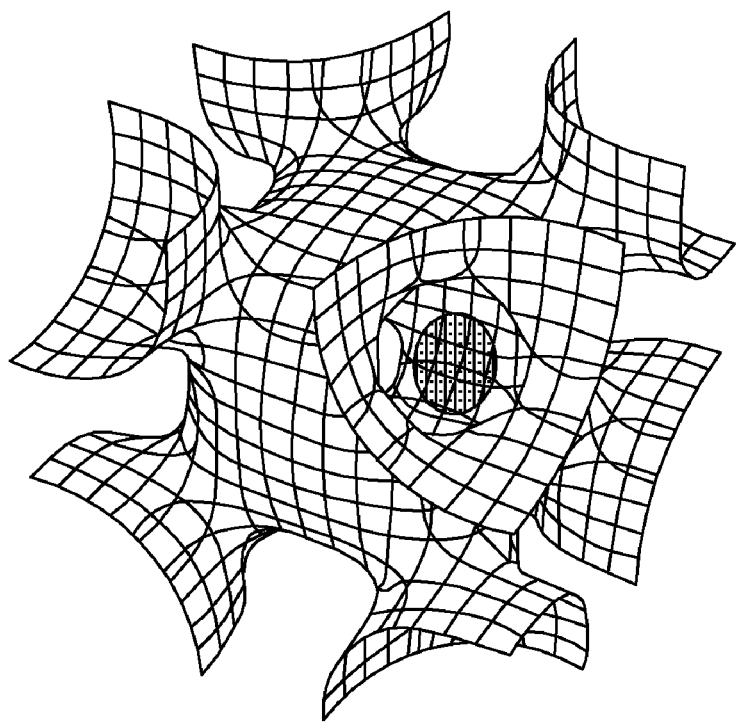
FIGS. 1A and 1B are schematic views of a preferred embodiment of the present invention.
Figure 1B:
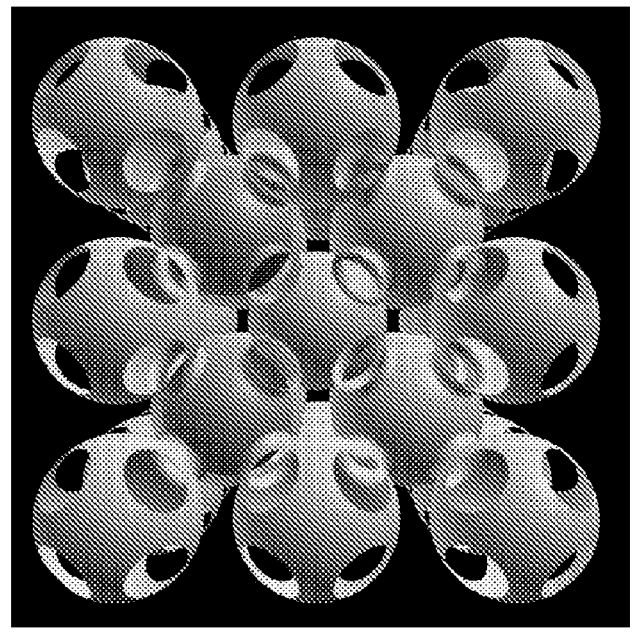
Figure 1C:
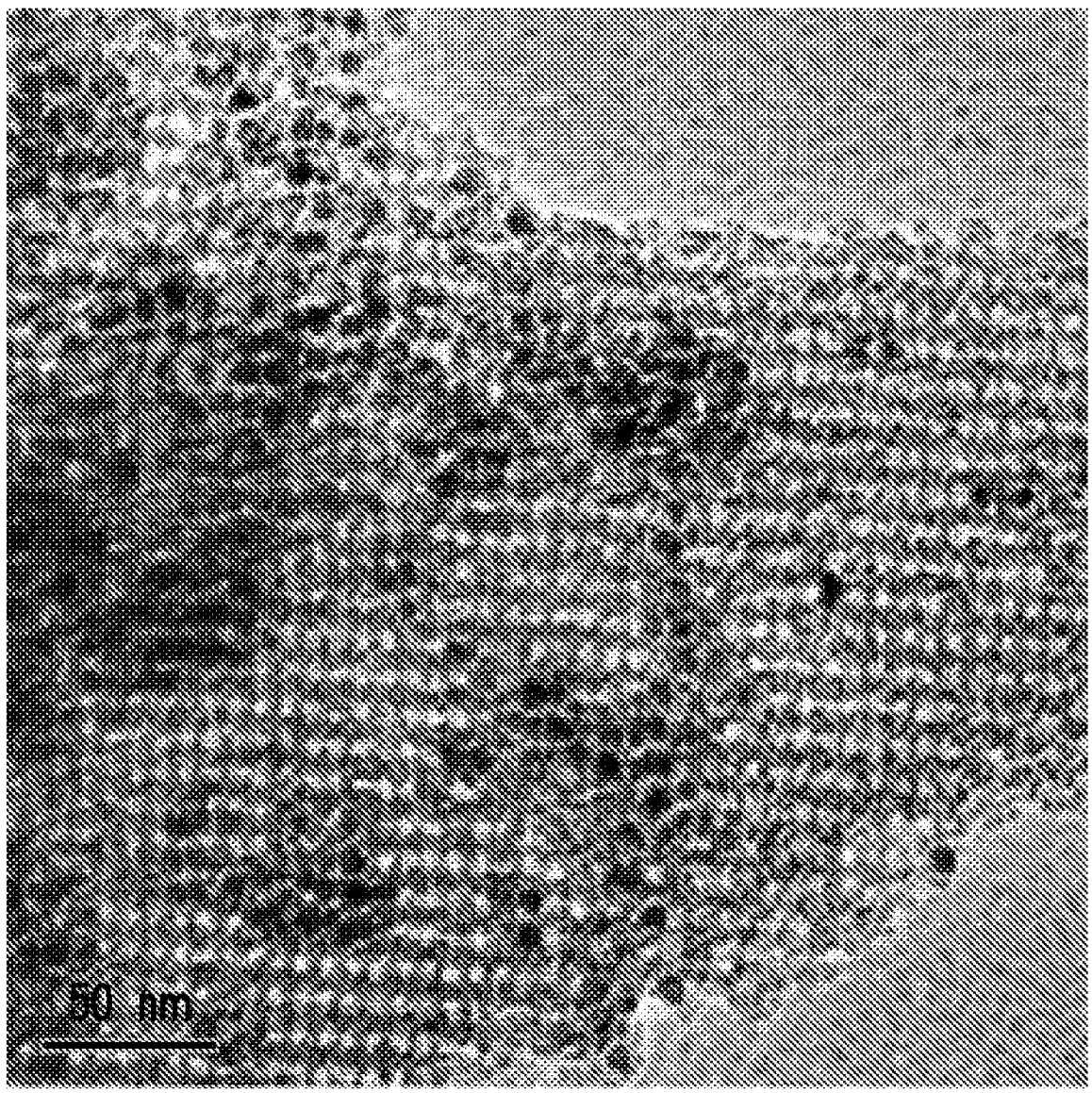
FIG. 1C is TEM view of the preferred embodiment of the invention shown in FIGS. 1A and 1B.

The structure of SBA-16 prevents Ni particles from sintering and allow easy access of sulfur-containing molecules to the Ni particles by diffusion through a 3-dimensional interconnected pore structure. While SBA-16 was described here in it is to be distinctly understood that the invention is not limited thereto but that a variety of other types of mesoporous materials may also be utilized within the spirit and scope of the present invention. In this embodiment the nickel was introduced by impregnation of the silica support at 16.6 wt. %) using a nickel salt solution, following by drying, air oxidation (calcination), and in situ reduction. While this method of preparation is described it is to be distinctly understood that the invention is not limited thereto but may be variously embodied according the respective needs and necessities of a particular user. FIG. 1C provides a transmission electron microscopy (TEM) image of fresh sulfur adsorbent comprising 16.6 wt % Ni in SBA-16.

Figure 2A:
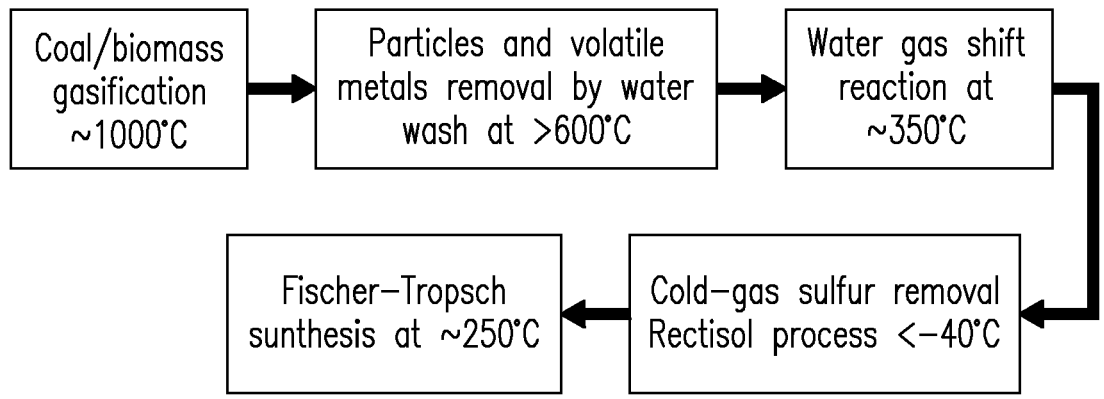
FIG. 2A is a schematic view of a prior art desulfurization method
Figure 2B:
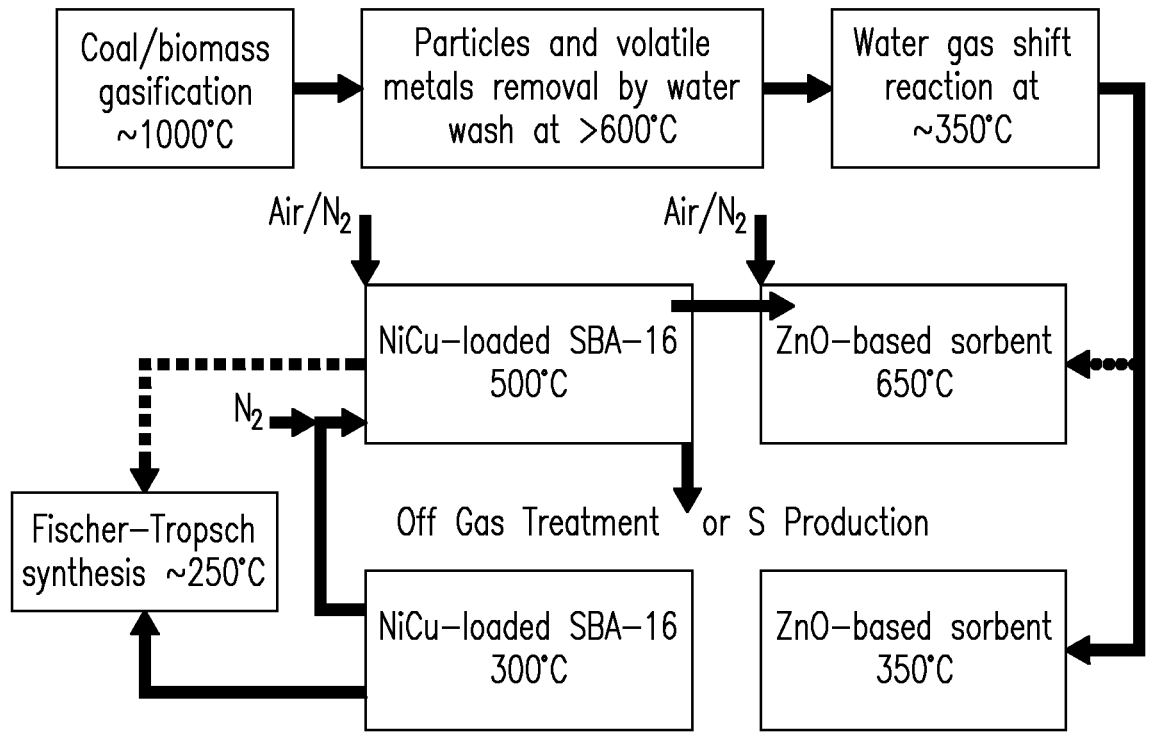
FIG. 2B is a schematic view of one embodiment of the present invention.

In use a warm stream of a fuel gas such as syngas is passed over these sorbents. Referring now to FIGS. 2A and 2B schematic views of a prior art method 2A and one embodiment of the inventive method 2B are shown. Referring first to FIG. 2A a high level flow sheet for sulfur removal from syngas using Rectisol process is shown. Such a process requires that the temperature of the gas stream fluctuate so as to allow for sulfur removal at −40° C. using cold methanol. Such a process is energetically inefficient because of the temperature swings that must be accomplished in order to raise and lower the temperature of the gas for desulfurization to take place.

FIG. 2B shows a high level flow sheet of one embodiment of the method of the present invention wherein high level flow sheet of deep sulfur removal from warm syngas using ZnO and NiCu-loaded SBA-16 composite sorbent. This process shows that sulfur removal at 350° C. (ZnO-based bed) and 300° C. (NiCu-loaded SBA-16 bed). Regeneration of the sorbents at 650° C. (ZnO-based bed, with air/$N_2$) and 500° C. (NiCu-loaded SBA-16 bed, with alternative treatment of air/$N_2$ and clean syngas/$N_2$). During regeneration, off-gas from ZnO bed and from oxidation treatment of NiCu-SBA-16 bed will be combined for sulfur production. Off-gas from NiCu-SBA-16 bed during reduction treatment will go through an off-gas treatment system to oxidize the reductants and absorb sulfur. This off-gas stream can also be combined with the main off-gas stream for S production.

Figure 3:
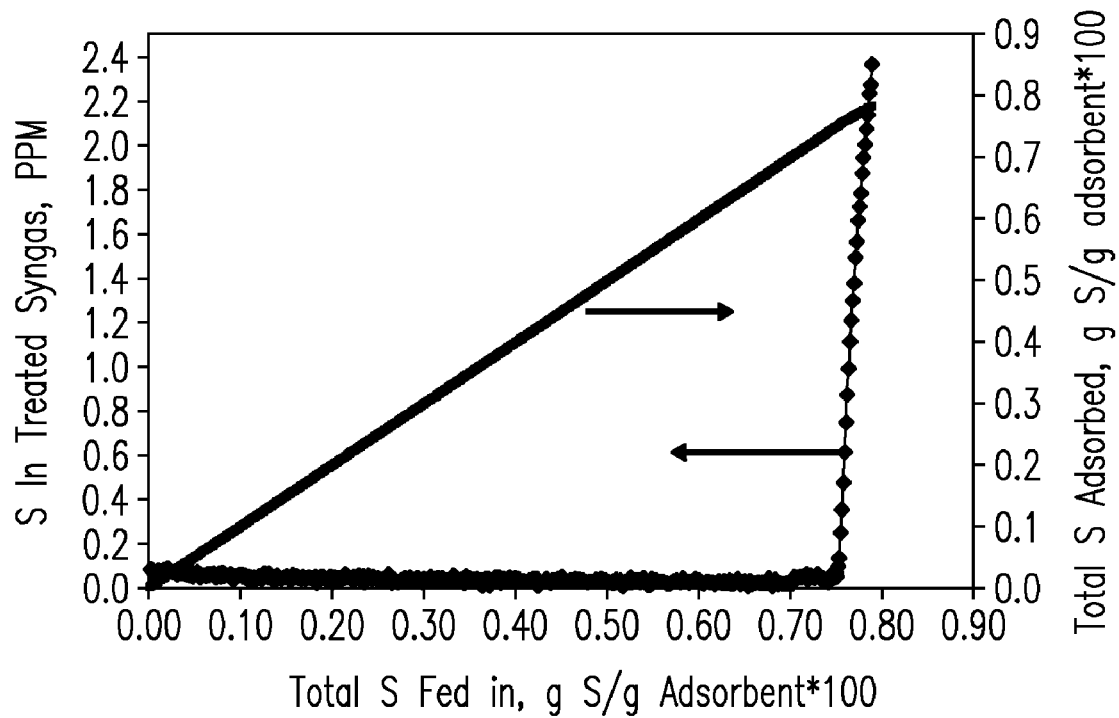
FIG. 3 is a graph showing the sulfur removing capacity of one embodiment of the present invention

In one example, coal gas deep desulfurization was performed using syngas containing 10 ppm $H_2S$ (representative of a post-ZnO bed), a sulfur capacity of 0.75 wt % was achieved before 100 ppb $H_2S$ was observed in the treated gas. A rough calculation of the sulfur-to-Ni atomic ratio confirms that the $H_2S$ removed can be accounted for by chemisorption on the Ni surface (capacity of ~1.0 wt. % assuming $Ni_2S$ surface stoichiometry). Thus, bulk nickel sulfide formation is unlikely to contribute significantly to the overall sulfur capacity. The result of this reaction is shown in FIG. 3.

Figure 4:
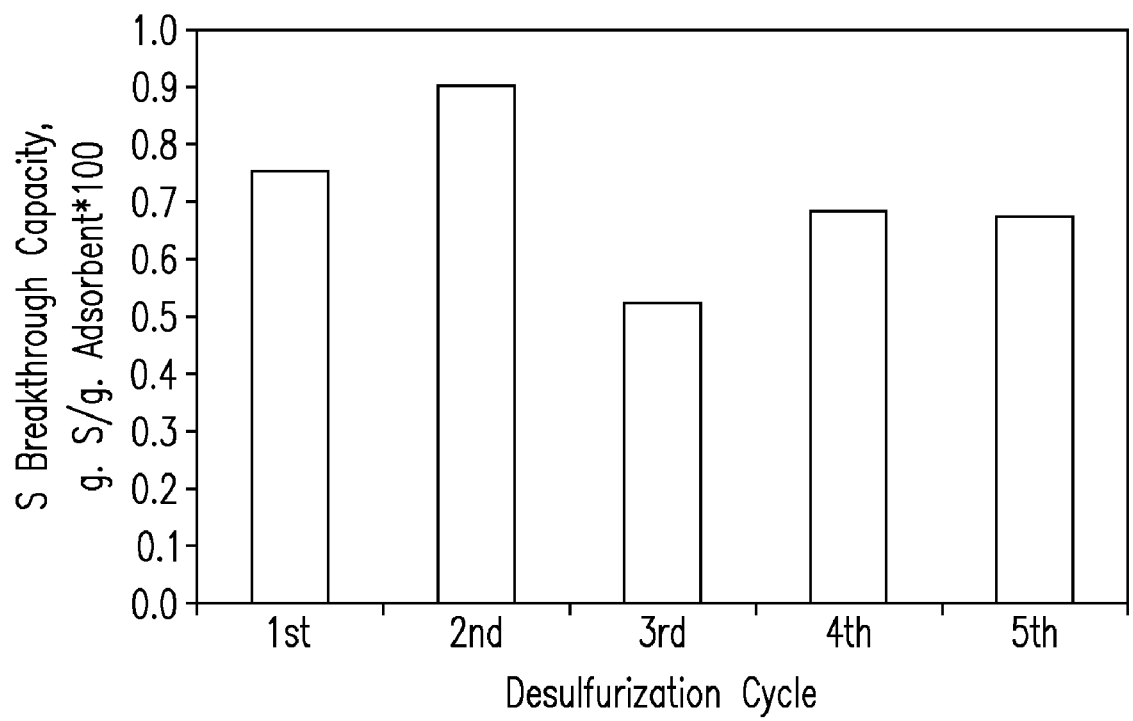
FIG. 4 is a graph showing a summary of test results on one embodiment of the invention.
Figure 5:
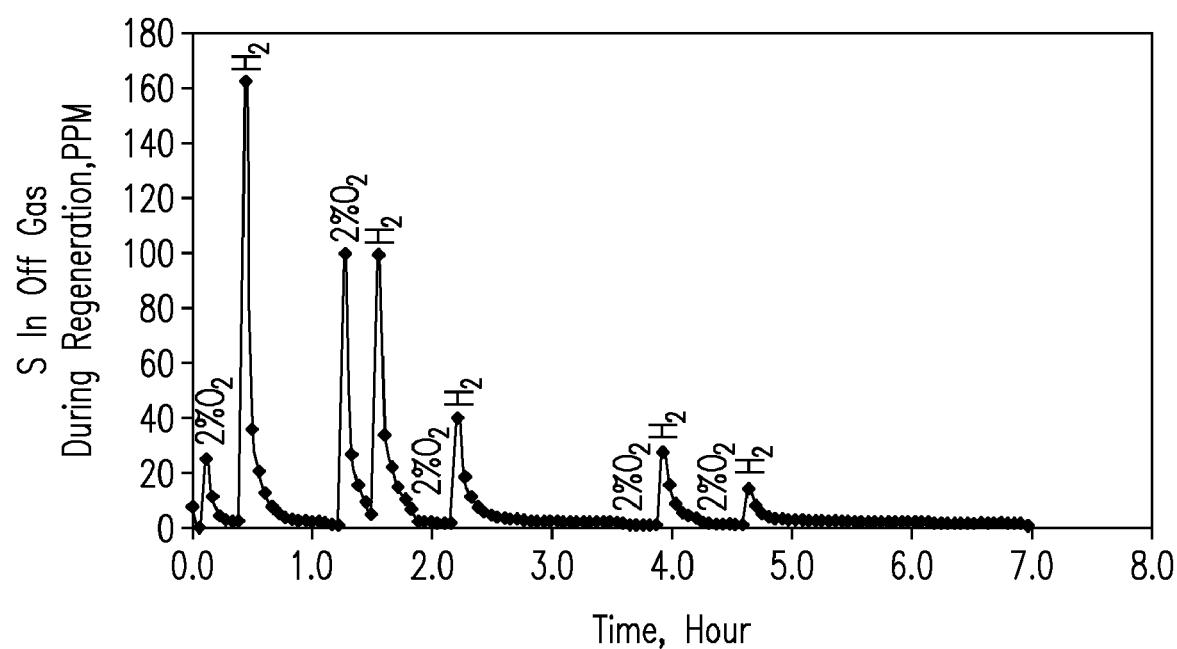
FIG. 5 is a chart showing one regeneration cycle.

FIG. 4 shows a summary of the test results for the Ni-SBA-16 sorbent through five cycles. The $2^{nd}$ cycle gave the highest sulfur capacity, possibly due to metal redistribution. The third cycle, which employed clean syngas (14% $CO_2$, 38% $H_2$, 48% CO) gave lower subsequent capacity than when pure hydrogen was employed. A steady state performance level of 0.68 wt % sulfur capacity was reached in the $4^{th}$ and $5^{th}$ cycles. Although this capacity value appears somewhat low, as a regenerable guard bed that would be required to reduce sulfur gases from 3 ppm to 50 ppb, and for the flow rates used in our tests, the time between regeneration cycles would be approximately 100 hours. For ZnO-based sorbent to reduce high sulfur coal gases from 1000 ppm to 3 ppm, the time between regeneration cycles would be approximately 20 hours. Thus, in an integrated regenerable bed, the relative weight of this Ni-SBA-16 sorbent to ZnO would be about 1 to 5.

After use, regeneration of the sulfided Ni-SBA-16 was carried out by a sequence of oxidation-reduction cycles. In these cycles the oxidizing gas was 10% air in Ar, and the reducing gas was pure $H_2$. Monitoring the off-gas by mass spectrometry during the regeneration process indicated that under both the oxidative and reductive sequences $SO_2$ is the primary sulfur species. This "oxidation-reduction" process was typically repeated 5 times. In this process various reactions took place: These reactions include:

Oxidation: $Ni_2S+2O_2=2NiO+SO_2$ (2)

$2Ni_2S+5O_2=2NiSO_4+2NiO$ (3)

$2NiO+2SO_2+O_2=2NiSO_4$ (4)

$2Ni_{(bulk)}+O_2=2NiO_{(bulk)}$ (5)

Reduction: $NiSO_4+H_2=NiO+H_2O+SO_2$ (6)

$2NiSO_4+6H_2=Ni_2S+SO_2+6H_2O$ (7)

$NiO_{(bulk\ and\ surface)}+H_2=Ni_{(bulk\ and\ surface)}+H_2O$ (8)

$3H_2+SO_2=H_2S+2H_2O$ (9)

$H_2S+2Ni=Ni_2S+H_2$ (10)

During the oxidation step, both adsorbed sulfur and any non-sulfided nickel are oxidized. The oxidized sulfur is partially released as $SO_2$, but some nickel sulfate remains, either by direct oxidation of surface $Ni_2S$ or by subsequent combination reaction of $SO_2$ with NiO in the presence of oxygen. During the subsequent reduction step, the nickel sulfate is converted to Ni, $SO_2$ and water, along with nickel sulfide, which can be produced either by direct reduction or through intermediate $H_2S$ re-adsorbing on the reduced Ni sites. No elemental sulfur was observed downstream of the adsorbent bed. The above reaction schemes require several redox cycles to fully regenerate the used adsorbents. Overall, this oxidation-reduction regeneration is more effective than the simple reduction regeneration because all the reactions are thermodynamically favored. A graph showing these reactions is set forth in FIG. 5.

FIG. 6 shows examples and comparisons of various substances. A blank test was run using SBA-16 without any nickel. No sulfur removal was observed. Ni supported on commercial fumed $SiO_2$ showed some regenerable sulfur capacity. However this capacity is low because large Ni particles are present and it is easy for the Ni particles to agglomerate and grow during regeneration. Nickel supported within a different mesoporous $SiO_2$ (two-dimensional hexagonal SBA-15) gave very high first cycle sulfur removal capacity (3 wt %). However, the adsorbent could not be regenerated using the "oxidation-reduction" process. TEM analysis confirmed that nickel loaded into the hexagonal channels as very fine particles. However, after adsorption and regeneration, the nickel particles were found to have migrated out of the mesopore structure and sintered. A Ni adsorbent using γ-$Al_2O_3$ as support was also synthesized and tested. This adsorbent gave a non-regenerable 1.5 wt % capacity. However, the cubic mesostructure of SBA-16 appears to provide a 3-dimensional framework for retention of small Ni particles which is considered most effective in this application. However this result is not intended to be exhaustive of all of the various embodiments of the present invention. In addition to Ni other types of materials may also be utilized for particular advantage.

The performance of Ni in SBA-16 can be further improved by adding a small amount of copper to the nickel. Nickel and copper form an alloy, although there is evidence that the surface of the alloy tends to be enriched in copper under reducing conditions. Addition of copper improves the reducibility of the Ni-based sorbent. As a result, diluted $H_2$ or syngas may be used for the reductive regeneration step with Ni—Cu, whereas pure hydrogen was previously found to be required with Ni which significantly increases the operation cost. Also, pure hydrogen will not typically be available at a gasifier-synthesis facility unless hydrogen is intentionally produced. The surface enrichment by copper in the Ni—Cu alloy provides an additional benefit, as it is known to significantly reduce the Ni methanation activity.

Figure 7:
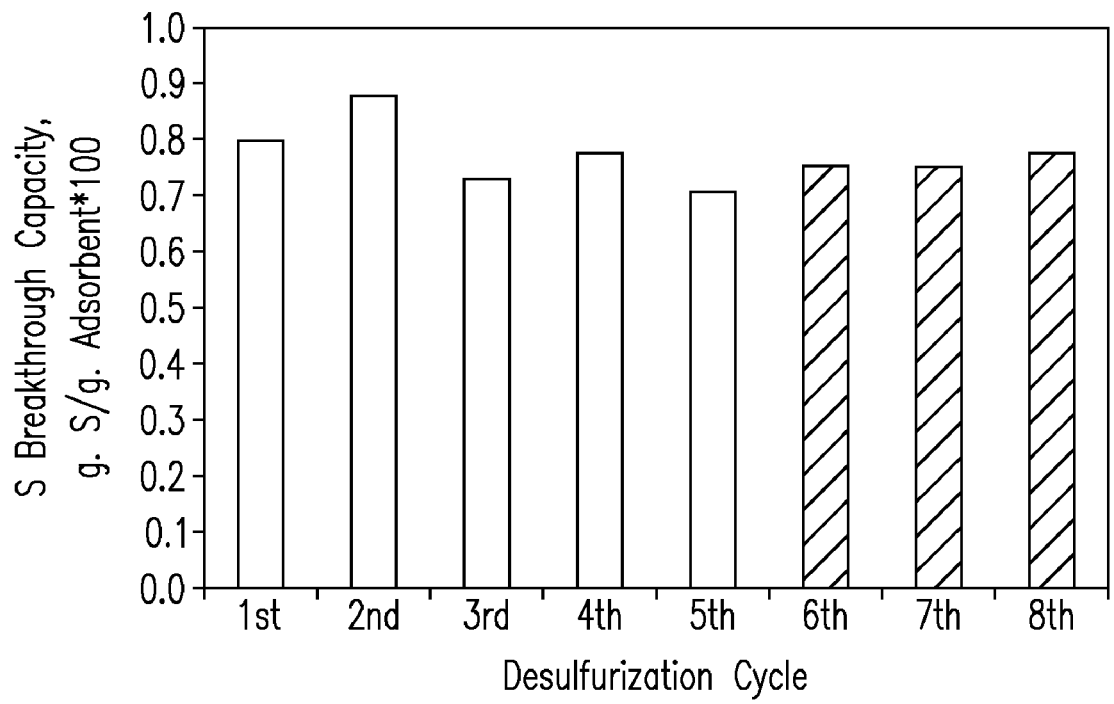
FIG. 7 is a chart showing the results of testing on an embodiment of the present invention.

The sulfur removal-regeneration performance of an adsorbent containing 1.6 wt % Cu and 15.0 wt % Ni in SBA-16 under the following test conditions is shown in FIG. 7. Sulfur removal from warm coal syngas using 1.6 wt % Cu and 15.0 wt % Ni-doped SBA-16 adsorbent. Test conditions: T=300° C.; coal gas composition: 23% $H_2$, 29% CO, 8% $CO_2$, 30% $H_2O$, 10% He, 10 ppm $H_2S$; flow rate: 12,000 $hr^{-1}$ GHSV. Regeneration conditions: four "oxidation-reduction" treatments at 500° C. Oxidation in 10% air in Ar at 24,000 $hr^{-1}$ GHSV. Reduction in 2% $H_2$ in Ar at 24,000 $hr^{-1}$ GHSV (for desulfurization cycle 1 to 5) and 5% $H_2O$- and S-free syngas in Ar at 24,000 $hr^{-1}$ GHSV (for desulfurization cycle 6 to 8). Three minutes purge with Ar between oxidation and reduction treatment.

These results demonstrate a stable breakthrough capacity of approximately 0.75 wt % sulfur was maintained through 8 desulfurization cycles, very similar to the capacity demonstrated with the pure nickel sorbent. The regenerations were performed at 500° C. using 2% $H_2$ (for cycles 1 to 5) and 5% clean syngas (for cycles 6 to 8) as the reducing gas, and 10% air as the oxidation gas. Four redox treatments were carried out for each regeneration. Methane production with fresh Ni—Cu-SBA-16 was 0.16 mol %, vs. 0.7 mol % for the regenerated copper-free nickel adsorbent. No changes in concentration of CO, $CO_2$, and $H_2$ in the treated syngas were observed during sulfur removal. Pure Cu-SBA-16 was also evaluated for sulfur removal effectiveness. A high initial sulfur capacity was achieved (0.8 wt %), very similar to the Ni and Ni—Cu samples, but despite the confining pore structure of the SBA-16 the capacity reduced to less than 0.2% following regeneration, indicative of metal Cu sintering.

Figure 8:
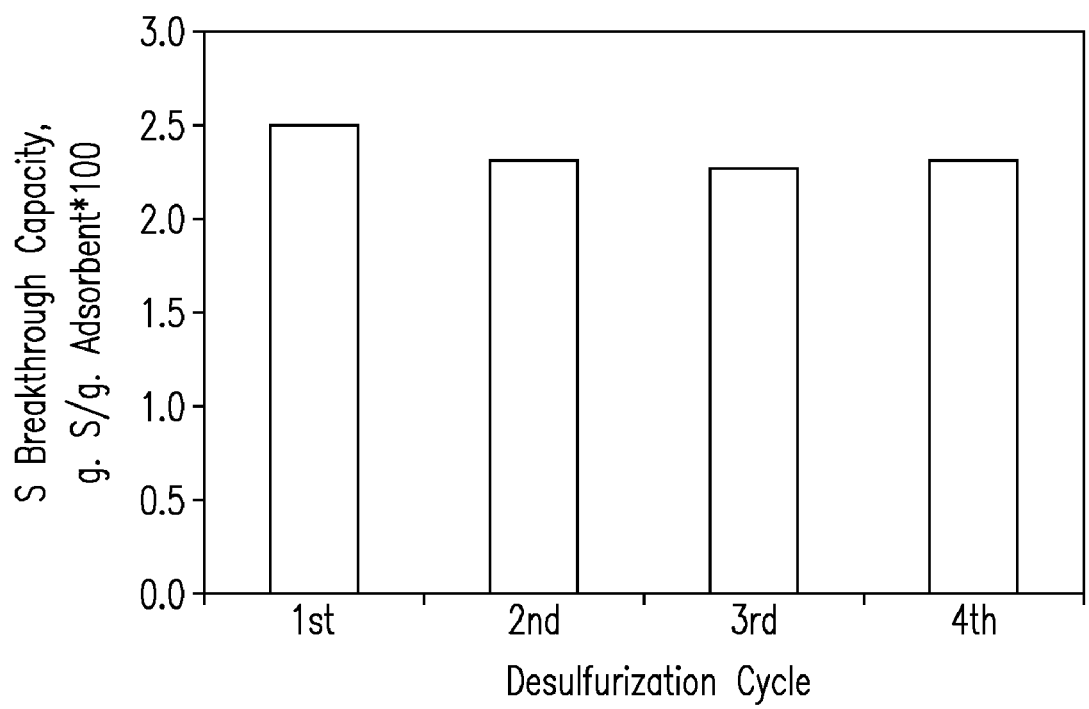
FIG. 8 is a chart showing the results of testing in a second embodiment of the present invention.

The Ni—Cu-SBA-16 sorbent (15 wt. % Ni, 1.6% Cu) was then tested for desulfurization of syngas simulated from a biomass gasifier. Test conditions: T=300° C.; biomass gas composition: 18% $H_2$, 12% CO, 10% $CO_2$, 50% $H_2O$, 4% He, 36 ppm $H_2S$; flow rate: 12,000 $hr^{-1}$ GHSV. Regeneration conditions: four "oxidation-reduction" treatments at 500° C. Oxidation in air at 14,000 $hr^{-1}$ GHSV. Reduction in clean dry syngas at 14,000 $hr^{-1}$ GHSV. Three minutes purge with Ar between oxidation and reduction treatment. The sulfur capacity with the biomass-based syngas is significantly higher than with the coal-based syngas, at 2.3 wt. % approximately a factor of 3 increase. A similar uptake capacity was also obtained with carbonyl sulfide was used as the sulfur gas. This is a very positive result, as adsorbents such as zinc oxide are less effective in removing COS than $H_2S$. The higher sulfur concentration in the feed likely contributes to these higher capacities (uptake capacity increases with $H_2S$ partial pressure), but in addition the higher concentration of steam and lower concentration of CO may also contribute to the better performance. At this uptake capacity, sulfur removal cannot be explained simply by a surface adsorption mechanism, and bulk formation of nickel sulfide must be invoked which was clearly observed via XRD analysis of sulfur-loaded sorbent. The performance over multiple regeneration cycles is given in FIG. 8, showing that the oxidation-reduction regeneration procedure is equally effective with a bulk metal sulfide.

A simplified "oxidation-reduction" procedure was found to be as effective as the multi-cycle procedure is. This procedure requires only two steps: oxidation at 700° C. in air for 20 hours and reduction at 500° C. in a reducing gas for 4 hours, such as in diluted or no-diluted clean syngas stream. At 700° C., $NiSO_4$ and $CuSO_4$ are not stable; they decompose to metal oxides and $SO_2$. As a result, almost all the sulfur on the sorbent can be removed during this step. This new procedure can be easily integrated with the regeneration procedure of used ZnO-based sorbents, which also requires high temperature (~700° C.) oxidation of ZnS. Major reactions occur during this regeneration procedure include:

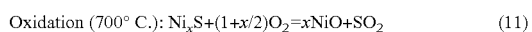

Oxidation (700° C.): $Ni_xS+(1+x/2)O_2=xNiO+SO_2$ (11)

$Cu_xS+(1+x/2)O_2=xCuO+SO_2$ (12)

Reduction (500° C.): $NiO+H_2=Ni+H_2O$ (13)

$CuO+H_2=Cu+H_2O$ (14)

In the nickel and copper loading configurations described above a significant fraction of voids within the mesoporous structure of SBA-16 remain. This suggests that higher loadings of metal within the material are possible, providing a means to increase sulfur sorption capacity. At higher capacity, it is possible to operate the Ni—Cu-SBA-16 sorbent as a stand-alone device, without the need for an upstream zinc oxide bed.

In summary, by trapping Ni and Ni—Cu alloy nanoparticles in three dimensional mesostructured silica SBA-16, we have developed a class of metal-based adsorbents that can remove sulfur from gasifier-produced syngas from either coal or biomass to less than 50 ppb levels. A combination of sulfur chemisorption and (at higher uptakes) bulk sulfide formation appears to occur. A sequential oxidation-reduction treatment can effectively regenerate the sulfur-loaded adsorbents. This solid adsorbent-based approach can provide economic advantages compared with existing technologies based on ambient or lower temperature solvent-based cleanup systems. With coal-based syngas that may contain several thousand ppm of sulfur, these adsorbents could be used in combination with a higher capacity zinc oxide absorbent, providing the necessary sub-ppm polishing capability that cannot be provided by zinc oxide alone. With biomass-based syngas, which typically may contain 30-80 ppm sulfur gases, these sorbents could form the basis for a sub-ppm, stand-alone desulfurization system.

While various preferred embodiments of the invention are shown and described, it is to be distinctly understood that this invention is not limited thereto but may be variously embodied to practice within the scope of the following claims. From the foregoing description, it will be apparent that various changes may be made without departing from the spirit and scope of the invention as defined by the following claims.

What is claimed is:

1. A method of manufacturing regenerable sorbents to remove gas phase sulfur from warm fuel gases, comprising:
    a. impregnating inorganic salts within a SBA-16 three dimensional mesoporous silica substrate; and
    b. calcining and reducing the inorganic salts to obtain active metal-based sorbents within the substrate.

2. The method of claim 1 wherein the warm fuel gases include natural gas, syngas, $H_2$, CO, and hydrocarbon gases, mixtures of hydrocarbon gasses, and mixtures of hydrocarbon gases and inert gases, and wherein the warm fuel gasses have a temperature between 20 and 900 degrees C.

3. A method for desulfurizing a gas, comprising:
    a. impregnating inorganic salts within a SBA-16 three dimensional mesoporous silica substrate;
    b. calcining and reducing the inorganic salts to obtain active metal-based sorbents within the substrate; and
    c. passing the gas over the substrate.

4. The method of claim 3 further comprising regenerating the active metal-based sorbents.

5. The method of claim 4 wherein the regenerating the active metal-based sorbents comprises subjecting the active metal-base sorbents to an oxidation-reduction process, utilizing oxidative gases that oxidize metal sulfides and reductive gas streams that reduce metal oxides.

6. The method of claim 5 wherein the oxidation-reduction process includes oxidation at approximately 700° C. in air for approximately 20 hours.

7. The method of claim 6 wherein the oxidation-reduction process includes reduction at approximately 500° C. in a reducing gas for approximately 4 hours.

8. The method of claim 7 wherein the reducing gas is syngas.

9. The method of claim 5 wherein the oxidative gases are air and its mixtures with inert gases and steam.

10. The method of claim 9 wherein the oxidative gases are $O_2$ and its mixtures with inert gases and steam.

11. The method of claim 9 wherein the oxidative gas is 2% $O_2$ in $N_2$.

12. The method of claim 9 wherein the reductive gases are $H_2$, CO, and their mixtures with inert gases.

13. The method of claim 5 wherein at least two regeneration steps are carried out, each regeneration step carried out for 2 to 10 oxidation-reduction cycles.

14. The method of claim 13 wherein the "oxidation-reduction" regeneration process is carried out at a temperature between 100° C. and 900° C.

* * * * *